US012689961B2

(12) United States Patent　　(10) Patent No.:　US 12,689,961 B2
Wang et al.　　　　　　　　　　(45) Date of Patent:　　　Jul. 21, 2026

(54) METHOD, DEVICE AND COMPUTER STORAGE MEDIUM OF COMMUNICATION

(71) Applicant: NEC CORPORATION, Tokyo (JP)

(72) Inventors: Da Wang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 785 days.

(21) Appl. No.: 18/012,552

(22) PCT Filed: Jun. 23, 2020

(86) PCT No.: PCT/CN2020/097821
§ 371 (c)(1),
(2) Date: Dec. 22, 2022

(87) PCT Pub. No.: WO2021/258307
PCT Pub. Date: Dec. 30, 2021

(65) Prior Publication Data
US 2023/0262566 A1　　Aug. 17, 2023

(51) Int. Cl.
*H04W 36/30*　　　(2009.01)
*H04W 36/00*　　　(2009.01)

(52) U.S. Cl.
CPC ... *H04W 36/305* (2018.08); *H04W 36/00698* (2023.05)

(58) Field of Classification Search
CPC ..................... H04W 36/305; H04W 36/00698
See application file for complete search history.

(56) References Cited

U.S. PATENT DOCUMENTS

| | | | |
|---|---|---|---|
| 2019/0182881 A1 | 6/2019 | Teyeb et al. | |
| 2022/0394583 A1* | 12/2022 | Deenoo | H04W 36/305 |
| 2023/0292390 A1* | 9/2023 | Zhang | H04W 76/19 |
| 2024/0236801 A1* | 7/2024 | Selvaganapathy | |
| | | | H04L 41/0668 |

FOREIGN PATENT DOCUMENTS

| | | |
|---|---|---|
| CN | 11022588 A | 7/2019 |
| CN | 110022588 A | 7/2019 |
| CN | 110784896 A | 2/2020 |

(Continued)

OTHER PUBLICATIONS

Chinese Office Communication for CN Application No. 202080102215.8 mailed on Apr. 4, 2025 with English Translation.

(Continued)

*Primary Examiner* — Rafael Pérez-Gutiérrez
*Assistant Examiner* — Frank E. Donado
(74) *Attorney, Agent, or Firm* — Sughrue Mion, PLLC

(57) ABSTRACT

Embodiments of the present disclosure relate to methods, devices and computer readable media for communication. A method of communication comprises determining, at a terminal device, whether a first failure of a first access attempt to a first cell of a first network device occurs, the first network device being a secondary node serving the terminal device, a second network device being a master node serving the terminal device; and in accordance with a determination that the first failure occurs, transmitting at least first information about the first failure to the first network device or the second network device. In this way, a reporting of SCG failure information can be enhanced.

15 Claims, 6 Drawing Sheets

(56) References Cited

FOREIGN PATENT DOCUMENTS

| CN | 115315986 A | 11/2022 |
| WO | 2019/194715 A1 | 10/2019 |
| WO | 2020/052550 A1 | 3/2020 |
| WO | 2021/160509 A1 | 8/2021 |

OTHER PUBLICATIONS

Intel Corporation, R2-1813986, Issues on SCG Failure measurement reporting, Oct. 8-12, 2018.

EP Official Communication for EP Application No. 20941902.7, mailed on Oct. 16, 2024.

Nokia et al., "On how to close the open issues for Conditional PSCell Change", 3GPP Draft; R2-2003107, Apr. 9, 2020.

ZTE, "Summary for SN_change_failure", 3GPP Draft; R3-201127, Mar. 8, 2020.

CATT, "Open Issues of SCG Failure", 3GPP TSG-RAN WG2 #99, Aug. 25, 2017, 5 pages.

NTT Docomo, Inc., "Remaining issues on SCG failure handling" 3GPP TSG-RAN WG2 #99bis, Oct. 9-13, 2017, 6 pages.

ZTE Corporation, et al. "Further issues on MCG fast recovery", 3GP TSG RAN WG2 Meeting #109e, Feb. 24, 2020-Mar. 6, 2020, 4 pages.

International Search Report received for International Application PCT/CN2020/097821 dated Mar. 22, 2021.

Written Opinion received for International Application PCT/CN2020/097821 dated Mar. 22, 2021.

Extended European Search Report for EP Application No. 20941902.7, dated on Jul. 17, 2023.

CATT, "Failure Indication about Scg", 3GPP Draft; R2-2000102, 3rd Generation Partnership Project (3GPP), Mobile Competence Centre; 650, Route Des Lucioles; F-06921 Sophia-Antipolis Cedex; No. Electronic meeting; Feb. 24, 2020-Mar. 6, 2020, Feb. 14, 2020, pp. 1-pp. 3., vol. RAN WG2, France.

Samsung, "(TP for SON BL CR for TS 38.423) Solution for SN change failure", 3GPP Draft; R3-200572, 3rd Generation Partnership Project (3GPP), Mobile Competence Centre; 650, Route Des Lucioles; F-06921 Sophia-Antipolis Cedex, No. E-Meeting; Feb. 24, 2020-Mar. 6, 2020, Feb. 15, 2020, pp. 1-pp. 120., vol. RAN WG3, France.

Samsung, "[S003] Failure Type extension in SCG Failure Information msg for IAB", 3GPP Draft; R2-2005671, 3rd Generation Partnership Project (3GPP), Mobile Competence Centre; 650, Route Des Lucioles; F-06921 Sophia-Antipolis Cedex, No. E-Meeting; Jun. 1, 2020-Jun. 11, 2020, May 22, 2020, pp. 1-pp. 6., vol. RAN WG2, France.

Ericsson, "Stop timer T313 in SCG Fallure Information for NE-DC" 3GPP Draft; R2-1915369, 3rd Generation Partnership Project (3GPP), Mobile Competence Centre; 650, Route Des Lucioles; F-06921 Sophia-Antipolis Cedex, Nov. 7, 2019, pp. 1-pp. 3., vol. RAN WG2, No. Reno, USA; Nov. 18, 2019-Nov. 22, 2019, France.

Ericsson, "On the impact of UL LBT failures on measurement reporting delay" 3GPP Draft; R4-2001935, 3rd Generation Partnership Project (3GPP), Mobile Competence Centre; 650, Route Des Lucioles; F-06921 Sophia-Antipolis Cedex, pp. 1-pp. 4., No. Electronic Meeting; Feb. 24, 2020-Mar. 6, 2020, Feb. 14, 2020, vol. RAN WG4, France.

JP Official Communication for JP Application No. 2022-579903, mailed on Apr. 2, 2024 with English Translation.

Nokia, Nokia Shanghai Bell, "Failure Recovery for CPC", 3GPP TSG RAN WG2 #109_e R2-2000560, Feb. 24, 2020.

CN Office Action for CN Application No. 202080102215.8, mailed on Oct. 11, 2024 with English Translation.

CATT, "Summary document for Conditional PSCell Change for intra-SN in AI 6.9.4", 3GPP TSG-RAN WG2 Meeting #109e, R2-2000901, Feb. 21, 2020.

* cited by examiner

300

WHETHER A FIRST FAILURE OF A FIRST ACCESS ATTEMPT TO A FIRST CELL OF A FIRST NETWORK DEVICE OCCURS?

310

YES

TRANSMIT AT LEAST FIRST INFORMATION OF THE FIRST FAILURE TO A SECOND NETWORK DEVICE

320

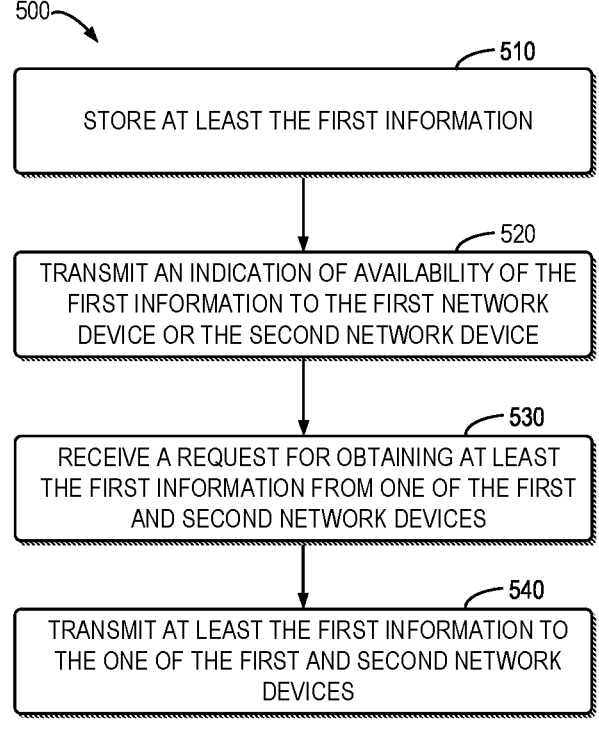

500

510
STORE AT LEAST THE FIRST INFORMATION

520
TRANSMIT AN INDICATION OF AVAILABILITY OF THE FIRST INFORMATION TO THE FIRST NETWORK DEVICE OR THE SECOND NETWORK DEVICE

530
RECEIVE A REQUEST FOR OBTAINING AT LEAST THE FIRST INFORMATION FROM ONE OF THE FIRST AND SECOND NETWORK DEVICES

540
TRANSMIT AT LEAST THE FIRST INFORMATION TO THE ONE OF THE FIRST AND SECOND NETWORK DEVICES

FIG. 5

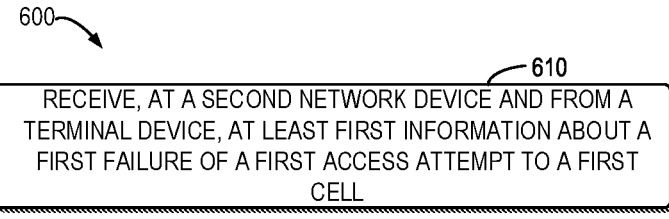

600

610
RECEIVE, AT A SECOND NETWORK DEVICE AND FROM A TERMINAL DEVICE, AT LEAST FIRST INFORMATION ABOUT A FIRST FAILURE OF A FIRST ACCESS ATTEMPT TO A FIRST CELL

RECEIVE, AT A FIRST NETWORK DEVICE AND FROM A
TERMINAL DEVICE, AT LEAST FIRST INFORMATION ABOUT A
FIRST FAILURE OF A FIRST ACCESS ATTEMPT TO A FIRST
CELL

800

840

850

810

PROCESSOR

MEMORY      820

PROG      830

METHOD, DEVICE AND COMPUTER STORAGE MEDIUM OF COMMUNICATION

CROSS REFERENCE TO RELATED APPLICATIONS

This application is a National Stage of International Application No. PCT/CN2020/097821, filed on Jun. 23, 2020.

TECHNICAL FIELD

Embodiments of the present disclosure generally relate to the field of telecommunication, and in particular, to methods, devices and computer storage media of communication during a reporting of a secondary cell group (SCG) failure information.

BACKGROUND

Generally, upon detecting a SCG failure such as a radio link failure for the SCG, reconfiguration with sync failure of the SCG, SCG configuration failure, or integrity check failure indication from SCG lower layers, a terminal device will report, to a master cell group (MCG), information about the SCG failure comprising a failure type, a measurement result and a location of the terminal device.

Currently, for a primary cell of SCG (also referred to as PScell), conditional PScell change (CPC) and conditional PScell addition (CPA) have been proposed. CPC is a PScell change procedure that is executed only when an execution condition is satisfied, and CPA is PScell addition procedure that is executed only when an execution condition is satisfied. On the other hand, it has been proposed that data collection for self-organizing network (SON) and minimization of drive testing (MDT) in new radio (NR) is needed to be enhanced. In this event, the above SCG failure report mechanism is insufficient for a reporting of SCG failure information for example in case of CPC and CPA.

SUMMARY

In general, embodiments of the present disclosure provide methods, devices and computer storage media of communication during a reporting of SCG failure information.

In a first aspect, there is provided a method of communication. The method comprises: determining, at a terminal device, whether a first failure of a first access attempt to a first cell of a first network device occurs, the first network device being a secondary node serving the terminal device, a second network device being a master node serving the terminal device; and in accordance with a determination that the first failure occurs, transmitting first information about the first failure to the first network device or the second network device.

In a second aspect, there is provided a method of communication. The method comprises: receiving, at a second network device and from a terminal device, first information about a first failure of a first access attempt to a first cell of a first network device, the first network device being a secondary node serving the terminal device, the second network device being a master node serving the terminal device.

In a third aspect, there is provided a method of communication. The method comprises: receiving, at a first network device and from a terminal device, first information about a first failure of a first access attempt to a first cell of the first network device, the first network device being a secondary node serving the terminal device.

In a fourth aspect, there is provided a terminal device. The terminal device comprises a processor and a memory coupled to the processor. The memory stores instructions that when executed by the processor, cause the terminal device to perform the method according to the first aspect of the present disclosure.

In a fifth aspect, there is provided a network device. The network device comprises a processor and a memory coupled to the processor. The memory stores instructions that when executed by the processor, cause the network device to perform the method according to the second aspect of the present disclosure.

In a sixth aspect, there is provided a network device. The network device comprises a processor and a memory coupled to the processor. The memory stores instructions that when executed by the processor, cause the network device to perform the method according to the third aspect of the present disclosure.

In a seventh aspect, there is provided a computer readable medium having instructions stored thereon. The instructions, when executed on at least one processor, cause the at least one processor to perform the method according to the first aspect of the present disclosure.

In an eighth aspect, there is provided a computer readable medium having instructions stored thereon. The instructions, when executed on at least one processor, cause the at least one processor to perform the method according to the second aspect of the present disclosure.

In a ninth aspect, there is provided a computer readable medium having instructions stored thereon. The instructions, when executed on at least one processor, cause the at least one processor to perform the method according to the third aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 5 illustrates another example method of communication implemented at a terminal device in accordance with some embodiments of the present disclosure;

FIG. 6 illustrates an example method of communication implemented at a second network device in accordance with some embodiments of the present disclosure;

Throughout the drawings, the same or similar reference numerals represent the same or similar element.

DETAILED DESCRIPTION

Figure 1:
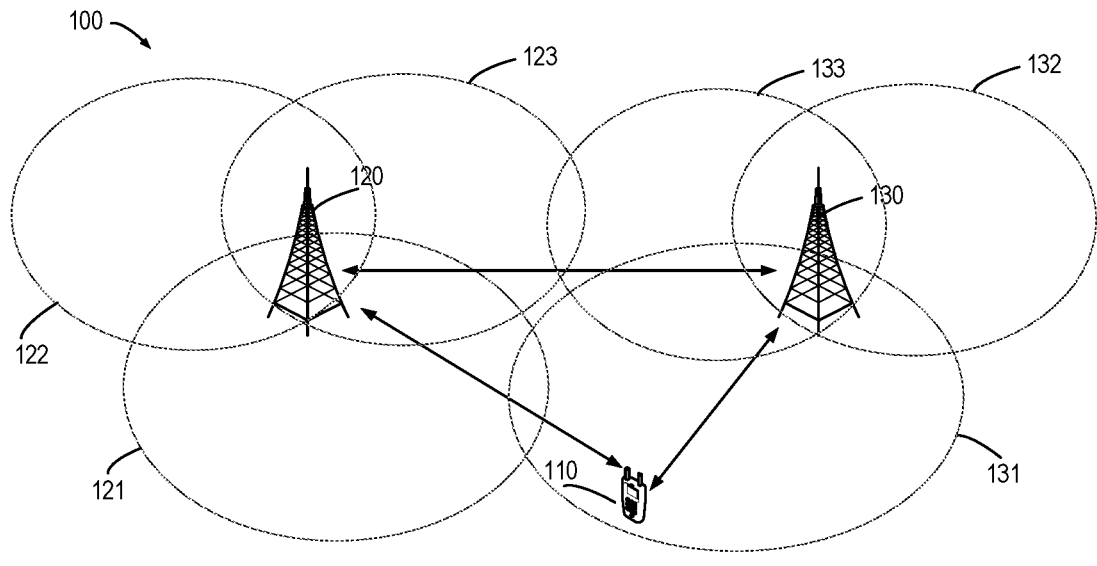
FIG. 1 illustrates an example communication scenario in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an evolved NodeB (eNodeB or eNB), a next generation NodeB (gNB), a transmission reception point (TRP), a remote radio unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different RATs. In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As mentioned above, it has been proposed that data collection for SON and MDT in NR is needed to be enhanced. SON features include coverage and capacity optimization (CCO), inter-system inter-radio access technology (RAT) energy saving, 2-step random access channel (RACH) optimization, mobility enhancement optimization, physical cell identifier (PCI) selection, energy efficiency (operation administration and maintenance (OAM) requirements), successful handovers reports, and UE history information in EUTRA-NR dual connection (EN-DC). Thus, a reporting from a terminal device is necessary to be specified to enhance the network configuration.

Currently, upon detecting a SCG failure, a terminal device will report information about the SCG failure to a MCG. This information only involves a failure type, a measurement result and a location of the terminal device. Such report mechanism is insufficient for a future release of 3GPP system, as more detailed failure information related to SCG addition and change is not reported, e.g., random access information. Further, how to control multiple CPA and CPC executions and store failure information of the multiple CPA and CPC executions also should be considered.

In view of the above, embodiments of the present disclosure provide a solution of reporting SCG failure information so as to solve the above and other problems. The solution can facilitate enhancement of SCG failure information report. Principles and implementations of the present disclosure will be described in detail below with reference to the figures.

FIG. 1 illustrates a schematic diagram of an example communication scenario 100 in which embodiments of the present disclosure can be implemented. As shown in FIG. 1, the communication scenario 100 may involve a terminal device 110, a first network device 120 and a second network device 130. The terminal device 110 can establish a dual connection (i.e., simultaneous connection) with the first and second network devices 120 and 130. In the context of the present application, the first network device 120 serves as a secondary node (SN) serving the terminal device 110, and the second network device 130 serves as a master node (MN) serving the terminal device 110.

The first network device 120 may communicate with the terminal device 110 via a channel such as a wireless communication channel. Similarly, the second network device 130 may also communicate with the terminal device 110 via a channel such as a wireless communication channel. The first network device 120 may communicate with the second network device 130 via a control-plane interface such as Xn-C or X2-C.

It is to be understood that the number of devices in FIG. 1 is given for the purpose of illustration without suggesting any limitations to the present disclosure. The communication scenario 100 may involve any suitable number of network devices and/or terminal devices adapted for implementing implementations of the present disclosure.

The communications in the communication scenario 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols, the sixth generation (6G) communication protocols or beyond.

As shown in FIG. 1, the first network device 120 may have cells 121, 122 and 123 which form a SCG, and the second network device 130 may have cells 131, 132 and 133 which form a MCG. It should be noted that the number of the cells in the SCG and that in the MCG are not limited to three, and more or less cells are also feasible. At least a part of the cells in the SCG and at least a part of the cells in the MCG can be configured to the terminal device 110. For convenience, assuming that cells 121, 122 and 123 in the SCG and cells 131, 132 and 133 in the MCG are configured to the terminal device 110. The cell 121 is a primary cell of the SCG (also referred to as PScell) and the cell 131 is a primary cell of the MCG (also referred to as Pcell).

For CPA and CPC, the second network device 130 may provide a CPA and CPC configuration to the terminal device 110. In some embodiments, the second network device 130 may configure one or more candidates for the PScell to the terminal device 110, and also configure a condition for access to the terminal device 110. In case of CPA, the candidates may be one or more cells of a network device or one or more cells of one or more network devices. In case of CPC, the candidates may be any other cells in the SCG except the current PScell. For illustration, assuming that the second network device 130 configures the cells 121, 122 and 123 as the candidates for the PScell.

During an operation, the terminal device 110 may determine which one of the cells 121, 122 and 123 satisfies the condition for access, and then access to the determined one. In some embodiments, the terminal device 110 may establish a connection with the first network device 120 for the first time, which is called as CPA. In some embodiments, the terminal device 110 may switch from a cell to another cell of the first network device 120 for the first time, which is called as CPC. Multiple failures in CPA or CPC may occur. In some embodiments, when a failure (also referred to as a SCG failure) of connection with a cell of the first network device 120 occurs, the terminal device 110 may trigger a CPA or CPC procedure.

According to embodiments of the present application, information about one or multiple SCG failures can be reported to the second network device 130 or the first network device 120. The information may comprise at least information about a random access procedure associated with each failure. In this way, more detailed information about SCG failure can be reported to the network, and data collection can be enhanced. More details will be described with reference to FIG. 2.

Figure 2:
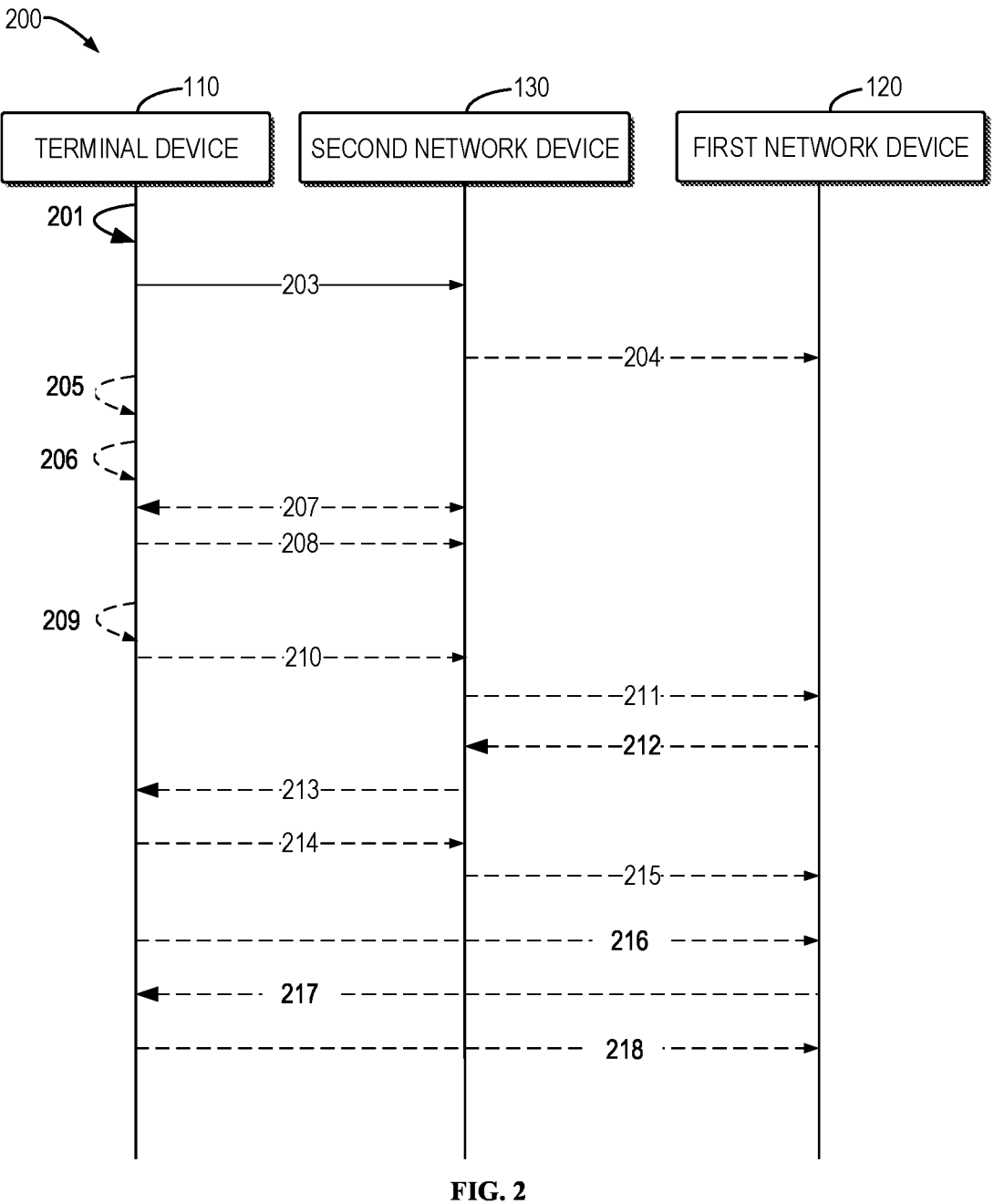
FIG. 2 illustrates a schematic diagram illustrating a process for communication during a reporting of SCG failure information according to some embodiments of the present disclosure.

FIG. 2 shows a schematic diagram illustrating a process 200 for communication during a reporting of SCG failure information according to embodiments of the present disclosure. For the purpose of discussion, the process 200 will be described with reference to FIG. 1. The process 200 may involve the terminal device 110, the first network device 120 and the second network device 130 as illustrated in FIG. 1.

In this embodiment, the terminal device 110 is in a dual connection with the first and second network devices 120 and 130, and the current PScell is the cell 121. The second network device 130 configures, to the terminal device 110, the cells 122 and 123 as candidates for the PScell and a condition for access. For illustration, assuming that with movement of the terminal device 110, a failure of a connection between the terminal device 110 and the cell 122 occurs. In this case, the following procedure of PScell change will be initiated. Although the following procedure is described in connection with a case of PScell change, it also can be applied to a case of PScell addition.

As shown in FIG. 2, the terminal device 110 may determine 201 whether a first failure of a connection with a first cell (for example, the cell 122) occurs. In some embodiments, upon the terminal device 110 and the cell 122 are disconnected with each other due to a radio link failure, reconfiguration with sync failure, etc., the terminal device 110 may determine that the first failure occurs. For example, in a reconfiguration with sync failure, upon the first cell satisfies a condition for access, the terminal device 110 performs a first access attempt to the first cell. Upon the first access attempt fails, the terminal device 110 may determine that the first failure occurs.

If determining that the first failure occurs, the terminal device 110 may transmit 203 at least information (for convenience, also referred to as first information herein) about the first failure to the second network device 130 as a SCG failure information report. It should be clarified that the terminal device 110 may transmit information about all the failures (in this example, first information) as a SCG failure information report.

In some embodiments, the first information may comprise at least one of the following:

a type of the first failure;

a first measurement result of a first measurement configured by the first network device;

a second measurement result of a second measurement configured by the second network device;

a location of the terminal device;

an identity of the failed cell (i.e., the first cell);

an identity of a previous primary cell of the first network device;

an identifier assigned to the terminal device by the first network device;

a time duration from initialization of connection of the previous primary cell to the first failure;

a time duration since the first failure; and information of a random access procedure associated with the first failure.

In this way, more detailed SCG failure information, e.g., random access information, can be provided for assisting the network side to identify the cause of the failure. According to embodiments of the present disclosure, such information can be generated for each failure event of a candidate.

In some embodiments, the terminal device 120 may transmit the first information via a radio resource control (RRC) message, for example, SCGFailureInformation/ SCGFailureInformationNR (EN-DC,NG EN-DC)/SCGFailureInformationEUTRA (NE-DC) message. It should be noted that any other existing or future developed RRC messages can also be used, and the present application does not make limitation for this.

Upon receiving the first information, for example, the second network device 130 may adjust a configuration for the first network device 120. In some embodiments, the second network device 130 may release the configuration of the first network device 120. In some alternative embodiments, the second network device 130 may modify the configuration of the first network device 120. In some alternative or additional embodiments, the second network device 130 may transmit 204 the first information to the first network device 120. With the first information, for example, the first network device 120 may adjust its configuration for the PScell. It should be noted that the use of the first information by the first and second network devices 120 and 130 is not limited to the above listed example, other uses are also feasible.

In some alternative embodiments, if the first failure occurs, the terminal device 110 may perform another access attempt to other candidates, without transmitting SCG failure information report to the second network device 130. In some alternative embodiments, the terminal device 110 may start 205 a timer upon the first failure occurs. In some embodiments, a value of the timer may be configured by the second network device 130 to the terminal device 110 along with the CPA and CPC configuration. It should be noted that the value of the timer also can be provided in any other suitable ways.

With the setting of the timer, the terminal device 110 may be allowed to continue evaluating other candidate PScell for a certain time duration after CPA and CPC failure. In this way, the condition for another attempt of CPA and CPC execution can be relaxed.

Upon the first failure occurs and the timer is running, the terminal device 110 may determine 206 whether other candidates (also referred to as a second cell herein, for example, the cell 123) satisfy the condition for access. If the cell 123 satisfies the condition for access, the terminal device 110 may perform 207 an access attempt (for convenience, also referred to as a second access attempt herein) to the cell 123. In some embodiments, another timer may be started upon each of access attempts to cells starts. In this way, the random access procedure can be controlled. If the second access attempt successes, the terminal device 110 may switch from the cell 121 to the cell 123. Further, the terminal device 110 may transmit 208 the first information about the first failure as a SCG failure information report.

If the second access attempt fails (also referred to as a second failure for convenience) and the timer expires, the terminal device 110 may transmit the first information and second information about the second failure to the second network device 130. In other words, the terminal device 110 may transmit information about all the failures (in this example, first and second information) as a SCG failure information report. The second information may be generated for the second failure in a similar way with the first information. For example, the second information may comprise at least one of the following:

a type of the second failure;

a first measurement result of a first measurement configured by the first network device;

a second measurement result of a second measurement configured by the second network device;

a location of the terminal device;

an identity of the failed cell (i.e., the second cell);

an identity of a previous primary cell of the first network device;

an identifier assigned to the terminal device by the first network device;

a time duration from initialization of connection of the previous primary cell to the second failure;

a time duration since the second failure; and information of a random access procedure associated with the second failure.

If the second failure occurs and the timer is running, the terminal device 110 may repeat the steps described in connection with 206-208 to continue to evaluate other candidates. If there is no a second cell satisfying the condition for access, the terminal device 110 may report the SCG failure information.

In some alternative embodiments, upon the first failure occurs, determining whether a second cell satisfies a condition for access;

in accordance with a determination that the second cell satisfies the condition for access, performing a second access attempt to the second cell;

in accordance with a second failure of the second access attempt and a determination that an access attempt is performed on all candidate cells of the first network device, transmitting, to the second network device, at least the first information and second information about the second failure; and in accordance with a success of the second access attempt, transmitting at least the first information to the first network device or the second network device For a PScell change or addition procedure, one or more failures for one or more candidate PScells may be reported. In this case, the terminal device 110 may store 209 SCG failure information about the one or more failures (for example, the first information, the second information, etc.) in a storage. The storage may be in any suitable forms. In some embodiments, upon each failure occurs, the terminal device may store all the information about the failure. In some embodiments, upon each failure occurs, the terminal device may store part of the information about the failure. The content of the information is similar with that of the first or second information, and thus its detail is omitted here.

In some embodiments in which SCG failure information is stored, the terminal device 110 may transmit 210 an indication of availability of the SCG failure information to the second network device 130. In this way, the network side can request for the SCG failure information in case of necessary.

In some embodiments, the second network device 130 may transmit 211 the indication to the first network device 120. Based on the indication, the first network device 120 may transmit 212 a request for obtaining the SCG failure information if necessary. The second network device 130 may transmit 213 the request for obtaining the SCG failure information to the terminal device 110. The terminal device 110 may transmit 214 the SCG failure information to the second network device 130 as a response to the request. Accordingly, the second network device 130 may transmit 215 the SCG failure information to the first network device 120.

For example, upon CPA/CPC finally fails, the terminal device 110 may transmit the SCG failure information via a RRC message (also referred to as a first message for convenience). For example, the first message may be SCGFailureInformation message. In some embodiments, the terminal device 110 may transmit, to the second network device 130, a SCGfailureinformation message with the indication of availability of the SCG failure information. The second network device 130 may transmit the indication to the first network device 120. The first network device 120 may feedback with a request for SCG failure information to the second network device 130 if necessary. The second network device 130 may request for this SCG failure information by sending a UEInformationRequest message with SCGfaililureInfoRequest indication. The terminal device 110 may response the second network device 130 with a UEInfomationResponse message which consist of SCG failure information of corresponding to one or more SCG failures. Then the second network device 130 may transmit the SCG failure information to the first network device 120.

As another example, upon the CPA or CPC procedure finally successes after one or more failures, the terminal device 110 may transmit the SCG failure information via a RRC message (also referred to as a second message for convenience). In some embodiments, the second message and the first message may be the same message. In some embodiments, the second message may be different from the first message. For example, the second message may be a ULInformationTransferMRDC message. In some embodiments, the terminal device 110 may transmit, to the second network device 130, a ULInformationTransferMRDC message with the indication of availability of the SCG failure information. The second network device 130 may transmit the indication to the first network device 120. The first network device 120 may feedback with a request for SCG failure information to the second network device 130 if necessary. The second network device 130 may request for this SCG failure information by sending a UEInformationRequest message with SCGfaililureInfoRequest indication. The terminal device 110 may response the second network device 130 with a UEInfomationResponse message which consists of SCG failure information of corresponding to one or more SCG failures. Then the second network device 130 may transmit the SCG failure information to the first network device 120. It should be noted that the above message is merely an example, and the present disclosure does not make any limitation for the message form.

In some alternative embodiments, the terminal device 110 may transmit 216 the indication to the first network device 120. Based on the indication, the first network device 120 may transmit 217 a request for obtaining the SCG failure information to the terminal device 110. In response to the request, the terminal device 110 may transmit 218 the SCG failure information to the first network device by signal radio bearer 3 (SRB3).

As an example, upon the CPA or CPC procedure finally successes after one or more failures, the terminal device 110 may transmit the SCG failure information to the first network device 120 via a RRC message (also referred to as a third message for convenience) by SRB3. For example, the RRC message may be a RRCReconfigurationComplete message.

As another example, the terminal device 110 may transmit, to the first network device 120, a RRCReconfigurationComplete message by SRB3 including the indication of availability of the SCG failure information. The first network device 120 may request for the SCG failure information to the terminal device 110 by a UEInformationRequest message with SCGfilureInfoRequest indication by SRB3 (this message now only support SRB1, should be enhanced to support SRB3), and the terminal device 110 may transmit, to the first network device 120, a UEInformationResponse message which consists of SCG failure information by SRB3 (this message now only support SRB1, should be enhanced to support SRB3). It should be noted that the above message is merely an example, and the present disclosure does not make any limitation for the message form.

Upon SCG failure, the first and second network device 120 and 130 may not fetch the SCG failure information immediately. In this case, the SCG failure information shall be managed. In some embodiments in which an indication of availability of the SCG failure information is transmitted to the second network device 130, if the terminal device 110 is connected with a third network device by one of a RRC reestablishment procedure, a RRC resume procedure and a handover procedure, the terminal device 110 may transmit the indication to the third network device. In some embodiments, the third network device may be the second network device 130. In some embodiments, the third network device may be a network device different from the second network device 130.

The terminal device 110 may transmit the SCG failure information to the third network device in response to receiving a request for obtaining the SCG failure information. Upon transmission of the SCG failure information to the third network device, the terminal device 110 may delete the SCG failure information.

In some alternative embodiments, the terminal device 110 may determine a first time duration during which the SCG failure information has been stored. If the first time duration exceeds a threshold duration, the terminal device 110 may delete the first information from the storage.

In some embodiments in which a failure (for example, the first failure) occurs, the terminal device 110 may determine whether a capacity of the storage comprising the first information is lower than a predetermined capacity. If the capacity of the storage is lower than the predetermined capacity, the terminal device 110 may store the first information. If the capacity of the storage is equal to or higher than the predetermined capacity, the terminal device 110 may delete third information in the storage to store the first information, the third information being stored earlier than the first information by a second time duration. For example, if the capacity of the storage is equal to or higher than the predetermined capacity, the terminal device 110 may delete the oldest SCG failure information to store the newest SCG failure information. Alternatively, the terminal device 110 may stop storing the newest information.

It should be note that actions shown in FIG. 2 are not always necessary for implementing embodiments of the present disclosure, and more or less actions may be adapted as needed. Corresponding to the processes described in FIG. 2, embodiments of the present disclosure provide methods of communication implemented at a terminal device, at a first network device being a SN and at a second network device being a MN. These methods will be described below with reference to FIGS. 3 to 8.

Figure 3:
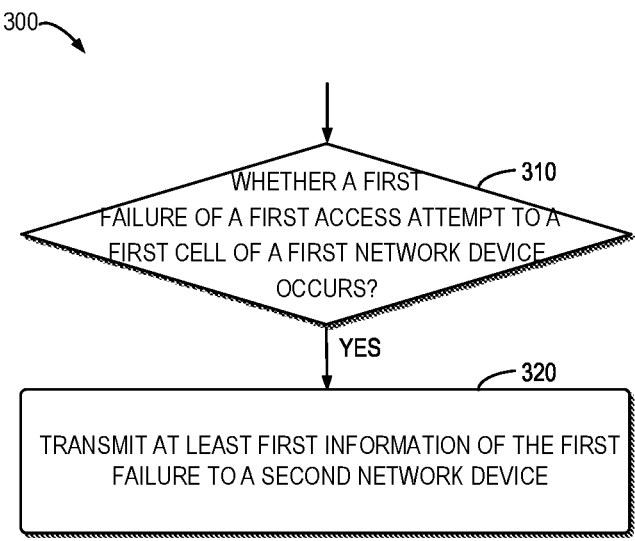
FIG. 3 illustrates an example method of communication implemented at a terminal device in accordance with some embodiments of the present disclosure.

FIG. 3 illustrates an example method 300 of communication implemented at a terminal device in accordance with some embodiments of the present disclosure. For example, the method 300 may be performed at the terminal device 110 as shown in FIG. 1. For the purpose of discussion, in the following, the method 300 will be described with reference to FIG. 1. It is to be understood that the method 300 may include additional blocks not shown and/or may omit some blocks as shown, and the scope of the present disclosure is not limited in this regard.

As shown in FIG. 3, at block 310, the terminal device 110 determines whether a first failure of a connection with a first cell (for example, the cell 122 in FIG. 1) occurs. In some embodiments, upon the terminal device 110 and the cell 122 are disconnected with each other due to a radio link failure, reconfiguration with sync failure, etc., the terminal device 110 may determine that the first failure occurs. In some embodiments, when the terminal device 110 performs a first access attempt to the first cell upon the first cell satisfies a condition for access, but the first access attempt fails, the terminal device 110 may determine that the first failure occurs.

In some embodiments, the terminal device 110 may attempt to access to the first cell by performing a random access procedure. For example, the random access procedure may be a 2-step random access channel (RACH) procedure. Of course, 4-step RACH procedure is also feasible. As another example, the random access procedure may be a contention based random access procedure. Alternatively, the random access procedure may be a non-contention based random access procedure. The present disclosure does not make any limitation for the random access procedure.

In some embodiments, the terminal device 110 may receive a CPA and CPC configuration from the second network device 130 in advance. The CPA and CPC configuration may comprise the candidates for the PScell and the condition for access. The present disclosure does not make any limitation for the candidates for the PScell and the condition for access.

Upon determining at block 310 that the first failure occurs, at block 320, the terminal device 110 transmits at least first information about the first failure to the first network device 120 or the second network device 130. In some embodiments in which one or more failures occur before the first failure for a SCG change or addition procedure, the terminal device 110 may transmit the first information and additional information about the one or more failures.

In some embodiments, the first information may comprise at least one of the following:

a type of the first failure;

a first measurement result of a first measurement configured by the first network device;

a second measurement result of a second measurement configured by the second network device;

a location of the terminal device;

an identity of the failed cell (i.e., the first cell);

an identity of a previous primary cell of the first network device;

an identifier assigned to the terminal device by the first network device;

a time duration from initialization of connection of the previous primary cell to the first failure;

a time duration since the first failure; and information of a random access procedure associated with the first failure.

In this way, more detailed SCG failure information, e.g., random access information, can be provided for assisting the network side to identify the cause of the SCG failure. According to embodiments of the present disclosure, such information can be generated for each failure event of a candidate.

In some embodiments, upon first failure occurs, the terminal device 110 may continue to evaluate whether other candidates can be accessed. It will be described in detail in connection with FIG. 4.

Figure 4:
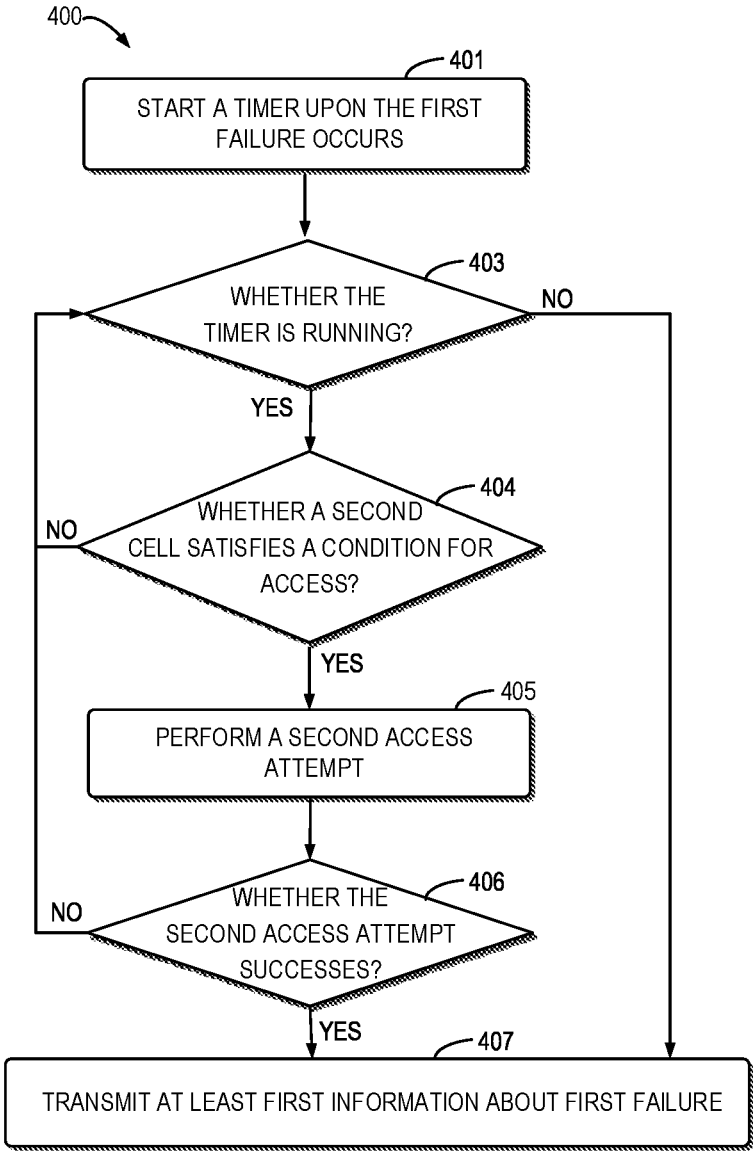
FIG. 4 illustrates another example method of communication implemented at a terminal device in accordance with some embodiments of the present disclosure.

FIG. 4 illustrates another example method 400 of communication implemented at a terminal device in accordance with some embodiments of the present disclosure. For example, the method 400 may be performed at the terminal device 110 as shown in FIG. 1. For the purpose of discussion, in the following, the method 400 will be described with reference to FIG. 1. It is to be understood that the method 400 may include additional blocks not shown and/or may omit some blocks as shown, and the scope of the present disclosure is not limited in this regard.

As shown in FIG. 4, at block 401, the terminal device 110 may start the timer upon the first failure occurs. In some embodiments, a value of the timer may be configured by the second network device 130 to the terminal device 110 along with the CPA and CPC configuration. Of course, the value of the timer may also be determined in any other suitable ways. With the setting of the timer, the terminal device 110 can be controlled to continue to evaluate other candidates.

At block 403, the terminal device 110 may determine whether the timer is running. If determining at block 403 that the timer is running, the process may proceed to block 404 to determine whether a second cell can be accessed.

In some embodiments, the terminal device 110 may determine whether a second cell (for example, the cell 123 in FIG. 1) satisfies the condition for access. The second cell is another candidate for the PScell. If determining at block 404 that the second cell satisfies the condition for access, the terminal device 110 may perform a second access attempt to the second cell at block 404. In some embodiments, the terminal device 110 may attempt to access to the second cell by performing a random access procedure. In some embodiments, another timer may be started upon each of access attempts to cells starts. In this way, the random access procedure can be controlled. The present disclosure does not make any limitation for the random access procedure.

At block 406, the terminal device 110 may determine whether the second access attempt successes. If determining that the second access attempt successes, at block 407, the terminal device 110 may transmit at least first information about the first failure to the first network device 120 or the second network device 130.

If determining at block 403 that the timer expires, the process proceeds to block 407. In some embodiments in which one or more failures occur after the first failure for a CPA or CPC procedure, at block 407, the terminal device may transmit the first information about the first failure and addition information about the one or more failures.

If determining at block 404 that the second cell does not satisfy the condition for access, the process may proceed to block 403, and repeat the operation of evaluating another candidate. If determining at block 406 that the second access attempt fails, the process may return to block 403 and repeat the operation of evaluating another candidate.

The following description is made on the transmission of the failure information with reference to FIG. 5. FIG. 5 illustrates another example method 500 of communication implemented at a terminal device in accordance with some embodiments of the present disclosure. For example, the method 500 may be performed at the terminal device 110 as shown in FIG. 1. For the purpose of discussion, in the following, the method 500 will be described with reference to FIG. 1. It is to be understood that the method 500 may include additional blocks not shown and/or may omit some blocks as shown, and the scope of the present disclosure is not limited in this regard.

As shown in FIG. 5, at block 510, the terminal device 110 may store at least the first information about the first failure. In some embodiments, the terminal device 110 may store, in a storage, the first information and if present, additional information about one or more failures occurred after the first failure for a CPA or CPC procedure.

At block 520, the terminal device 110 may transmit an indication of availability of at least the first information to the first network device 120 or the second network device 130. In this way, the terminal device 110 may inform the network side that SCG failure information is available from the terminal device 110.

At block 530, the terminal device 110 may receive a request for obtaining at least the first information from one of the first and second network devices 120 and 130. At block 540, the terminal device 110 may transmit at least the first information to the one of the first and second network devices 120 and 130. In this way, the network side can fetch the SCG failure information when necessary.

In some embodiments in which an indication of availability of the SCG failure information is transmitted to the second network device 130, if the terminal device 110 is connected with a third network device by one of a RRC reestablishment procedure, a RRC resume procedure and a handover procedure, the terminal device 110 may transmit the indication to the third network device. In some embodiments, the third network device may be the second network device 130. In some embodiments, the third network device may be a network device different from the second network device 130. In these embodiments, the terminal device 110 may transmit the SCG failure information to the third network device in response to receiving a request for obtaining the SCG failure information. Upon transmission of the SCG failure information to the third network device, the terminal device 110 may delete the SCG failure information. In this way, the SCG failure information can be managed.

In some alternative embodiments, the terminal device 110 may determine a first time duration during which the SCG failure information has been stored. If the first time duration exceeds a threshold duration, the terminal device 110 may delete the first information from the storage. In this way, the SCG failure information also can be managed.

In some embodiments in which a failure (for example, the first failure) occurs, the terminal device 110 may determine whether a capacity of the storage comprising the first information about the first failure is lower than a predetermined capacity. If the capacity of the storage is lower than the predetermined capacity, the terminal device 110 may store the first information. If the capacity of the storage is equal to or higher than the predetermined capacity, the terminal device 110 may delete third information in the storage to store the first information, the third information being stored earlier than the first information by a second time duration. For example, if the capacity of the storage is equal to or higher than the predetermined capacity, the terminal device 110 may delete the oldest SCG failure information to store the newest SCG failure information. Alternatively, the terminal device 110 may stop storing the newest information.

So far, the method of communication implemented at a terminal device are described. The implementations of the methods described in FIGS. 3-5 substantially correspond to the process described in connection with FIG. 2, and thus other details are not repeated here. With the methods 300-

500 according to embodiments of the present disclosure, a reporting of SCG failure information in case of CPA and CPC can be enhanced. Correspondingly, embodiments of the present application also provide a method of communication implemented at a network device (SN and MN). This will be described below with reference to FIGS. 6-7.

FIG. 6 illustrates an example method 600 of communication implemented at a second network device (i.e., MN) in accordance with some embodiments of the present disclosure. For example, the method 600 may be performed at the second network device 130 as shown in FIG. 1. For the purpose of discussion, in the following, the method 600 will be described with reference to the second network device 130 in FIG. 1. It is to be understood that the method 600 may include additional blocks not shown and/or may omit some blocks as shown, and the scope of the present disclosure is not limited in this regard.

As shown in FIG. 6, at block 610, the second network device 130 receives, from the terminal device 110, at least first information about a first failure of a first access attempt to a first cell of the first network device 120. In some embodiments, the second network device 130 may receive the first information and if present, additional information about one or more failures occurred before the first failure for a CPA or CPC procedure. In some embodiments, the second network device 130 may transmit, to the terminal device 110, a request for obtaining at least the first information, and receive at least the first information from the terminal device 110.

In some embodiments, the second network device 130 may transmit at least the first information to the first network device 120. In some embodiments, the second network device 130 may transmit the first information and the additional information if present to the first network device 120.

In some embodiments, the second network device 130 may receive an indication about availability of at least the first information. In some additional embodiments, the second network device 130 may transmit the indication to the first network device 120 and receive, from the first network device 120, a request for obtaining at least the first information. Then the second network device 130 may transmit the request to the terminal device 110 and receive at least the first information from the terminal device 110. As a result, the second network device 130 may transmit at least the first information to the first network device 120.

In some embodiments, the first information may comprise at least one of the following:

a type of the first failure;

a first measurement result of a first measurement configured by the first network device;

a second measurement result of a second measurement configured by the second network device;

a location of the terminal device;

an identity of the failed cell (i.e., the first cell);

an identity of a previous primary cell of the first network device;

an identifier assigned to the terminal device by the first network device;

a time duration from initialization of connection of the previous primary cell to the first failure;

a time duration since the first failure; and information of a random access procedure associated with the first failure.

Figure 7:
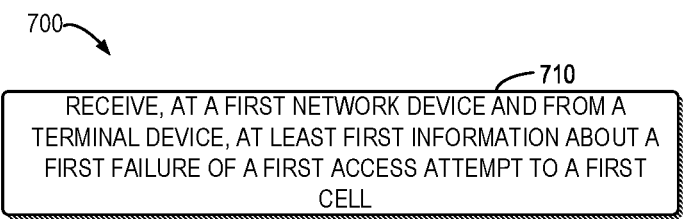
FIG. 7 illustrates another example method of communication implemented at a first network device in accordance with some embodiments of the present disclosure.

FIG. 7 illustrates an example method 700 of communication implemented at a first network device (i.e., SN) in accordance with some embodiments of the present disclosure. For example, the method 700 may be performed at the first network device 120 as shown in FIG. 1. For the purpose of discussion, in the following, the method 700 will be described with reference to the first network device 120 in FIG. 1. It is to be understood that the method 700 may include additional blocks not shown and/or may omit some blocks as shown, and the scope of the present disclosure is not limited in this regard.

As shown in FIG. 7, at block 710, the first network device 120 receives, from the terminal device 110, at least first information about a first failure of a first access attempt to a first cell of the first network device 120. In some embodiments, the first network device 120 may receive the first information and if present, additional information about one or more failures occurred before the first failure for a CPA or CPC procedure. In some embodiments, the first network device 120 may receive, from the terminal device 110, an indication about availability of at least the first information. In some embodiments, the first network device 120 may transmit, to the terminal device 110, a request for obtaining at least the first information, and receive at least the first information from the terminal device 110.

In some alternative embodiments, the first network device 120 may receive, from the second network device 130, an indication about availability of at least the first information. In some additional embodiments, the first network device 120 may transmit, to the second network device 130, a request for obtaining at least the first information, and receive at least the first information from the second network device 130.

In some embodiments, the first information may comprise at least one of the following:

a type of the first failure;

a first measurement result of a first measurement config-
    ured by the first network device;

a second measurement result of a second measurement
    configured by the second network device;

a location of the terminal device;

an identity of the failed cell (i.e., the first cell);

an identity of a previous primary cell of the first network
    device;

an identifier assigned to the terminal device by the first
    network device;

a time duration from initialization of connection of the
    previous primary cell to the first failure;

a time duration since the first failure; and information of a random access procedure associated with
    the first failure.

Figure 8:
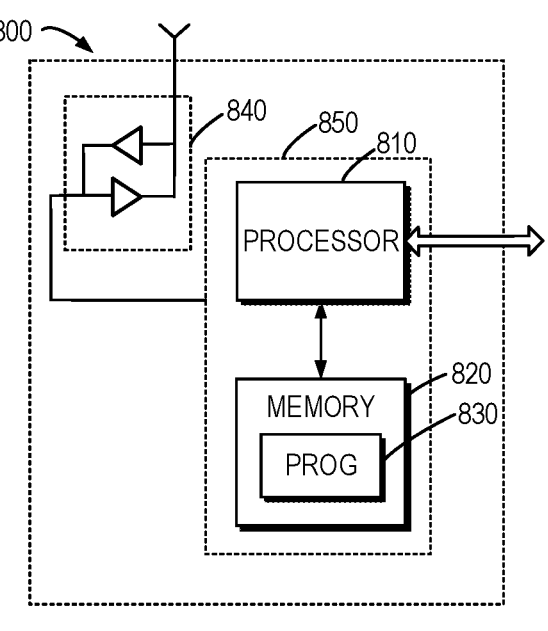
FIG. 8 is a simplified block diagram of a device that is suitable for implementing embodiments of the present disclosure.

FIG. 8 is a simplified block diagram of a device 800 that is suitable for implementing embodiments of the present disclosure. The device 800 can be considered as a further example implementation of the terminal device 110 or the first network device 120 or the second network device 130 as shown in FIG. 1. Accordingly, the device 800 can be implemented at or as at least a part of the terminal device 110 or the first network device 120 or the second network device 130.

As shown, the device 800 includes a processor 810, a memory 820 coupled to the processor 810, a suitable transmitter (TX) and receiver (RX) 840 coupled to the processor 810, and a communication interface coupled to the TX/RX 840. The memory 810 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 830 is assumed to include program instructions that, when executed by the associated processor 810, enable the device 800 to operate in accordance with the embodiments of the present disclosure, as discussed herein with reference to FIGS. 1 to 7. The embodiments herein may be implemented by computer software executable by the processor 810 of the device 800, or by hardware, or by a combination of software and hardware. The processor 810 may be configured to implement various embodiments of the present disclosure. Furthermore, a combination of the processor 810 and memory 820 may form processing means 850 adapted to implement various embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 1 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication performed by a terminal device, the method comprising:
   executing at least one of Conditional Primary Secondary Cell Group Cell (PSCell) Addition (CPA) and Conditional PSCell Change (CPC);
   detecting a failure in the at least one of the CPA and the CPC; and
   transmitting a Secondary Cell Group (SCG) failure information message, regarding the failure in the at least one of the CPA and the CPC, to a master node, wherein the SCG failure information message comprises:
      an identity of a failed PSCell;
      an identity of a previous PSCell of a secondary node;
      a time duration from initialization of connection of the previous PSCell until a first SCG failure; and
      first information of a random access procedure associated with the failure,
   wherein the SCG failure information message is further sent from the master node to a candidate secondary node or a target secondary node, for the at least one of the CPA and the CPC.

2. The method of claim 1, wherein a type of the failure is a reconfiguration with a sync failure.

3. The method of claim 1, wherein a type of the failure is related to an access attempt.

4. The method of claim 1, wherein the SCG failure information message further comprises second information indicating a failure type.

5. The method of claim 1, wherein candidate cells and conditions for the at least one of the CPA and the CPC are determined by the master node.

6. A method of communication performed by a master node, the method comprising:
   receiving from a terminal device, a Secondary Cell Group (SCG) failure information message regarding a failure in at least one of Conditional Primary Secondary Cell Group Cell (PSCell) Addition (CPA) and Conditional PSCell Change (CPC), wherein the SCG failure information message comprises:
      an identity of a failed PSCell;
      an identity of a previous PSCell of a secondary node;
      a time duration from initialization of connection of the previous PSCell until a first SCG failure; and
      first information of a random access procedure associated with the failure; and
   transmitting the SCG failure information message to a candidate secondary node or a target secondary node, for the at least one of the CPA and the CPC.

7. The method of claim 6, wherein a type of the failure is a reconfiguration with a sync failure.

8. The method of claim 6, wherein a type of the failure is related to an access attempt.

9. The method of claim 6, wherein the SCG failure information message further comprises second information indicating a failure type.

10. The method of claim 6, further comprising determining candidate cells and conditions for the at least one of the CPA and the CPC.

11. A terminal device comprising:
   a memory configured to store program instructions;
   a processor configured to execute the program instructions stored in the memory, that, when executed:
      executes at least one of Conditional Primary Secondary Cell Group Cell (PSCell) Addition (CPA) and Conditional PSCell Change (CPC);
      detects a failure in the at least one of the CPA and the CPC; and
   a transmitter configured to transmit a Secondary Cell Group (SCG) failure information message, regarding the failure in the at least one of the CPA and the CPC, to a master node, wherein the SCG failure information message comprises:
      an identity of a failed Primary SCG Cell (PSCell);
      an identity of a previous PSCell of a secondary node;

a time duration from initialization of connection of the previous PSCell until a first SCG failure; and first information of a random access procedure associated with the failure, wherein the SCG failure information message is further sent from the master node to a candidate secondary node or a target secondary node, for the at least one of the CPA and the CPC.

12. The terminal device of claim 11, wherein a type of the failure is a reconfiguration with a sync failure.

13. The terminal device of claim 11, wherein a type of the failure is related to an access attempt.

14. The terminal device of claim 11, wherein the SCG failure information message further comprises second information indicating a failure type.

15. The terminal device of claim 11, wherein candidate cells and conditions for the at least one of the CPA and the CPC are determined by the master node.

* * * * *